United States Patent
Uera et al.

(10) Patent No.: US 12,344,628 B2
(45) Date of Patent: Jul. 1, 2025

(54) METHOD FOR PRODUCING SILANE COMPOUND

(71) Applicant: MITSUBISHI GAS CHEMICAL COMPANY, INC., Tokyo (JP)

(72) Inventors: Kazuyoshi Uera, Tokyo (JP); Syouichi Itoh, Tokyo (JP); Kohei Kamatani, Tokyo (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 706 days.

(21) Appl. No.: 17/439,954

(22) PCT Filed: Mar. 19, 2020

(86) PCT No.: PCT/JP2020/012525
§ 371 (c)(1),
(2) Date: Sep. 16, 2021

(87) PCT Pub. No.: WO2020/196344
PCT Pub. Date: Oct. 1, 2020

(65) Prior Publication Data
US 2022/0185830 A1    Jun. 16, 2022

(30) Foreign Application Priority Data
Mar. 22, 2019 (JP) ................... 2019-055617

(51) Int. Cl.
*C07F 7/18* (2006.01)
(52) U.S. Cl.
CPC ................... *C07F 7/188* (2013.01)
(58) Field of Classification Search
CPC ........................................................ C07F 7/188
See application file for complete search history.

(56) References Cited

U.S. PATENT DOCUMENTS

| | | | |
|---|---|---|---|
| 6,172,253 B1 | 1/2001 | Kawamoto | |
| 2012/0184702 A1 | 7/2012 | Lange et al. | |
| 2021/0277033 A1* | 9/2021 | Katsoulis | ............... C07F 7/188 |

FOREIGN PATENT DOCUMENTS

| | | |
|---|---|---|
| CN | 107868101 A * | 4/2018 |
| EP | 1 008 621 A2 | 6/2000 |
| JP | 10-218885 | 8/1998 |
| JP | 2000-169484 A | 6/2000 |
| JP | 2008-297227 A | 12/2008 |
| JP | 2012-188398 A | 10/2012 |

OTHER PUBLICATIONS

M. Okamoto, et al., 261 Applied Catalysis A: General, 239-245 (2004) (Year: 2004).*
G. Olah, et al, 11, Synthesis 892-895 (1983)("Olah") (Year: 1983).*
CRC Handbook of Chemistry and Physics Appendix C (2004)("CRC") (Year: 2004).*
D.D. Perrin, et al, pKa prediction for organic acids and bases. vol. 1. London: Chapman and Hall, 1981 (Year: 1981).*
Copper-silicide-PubChem-2016 (Year: 2016).*
Extended European Searching Report issued in the corresponding European Patent Application No. 20779346.4 dated Apr. 4, 2022.
Okamoto et al. "Deoligomerization of siloxanes with dimethyl carbonate over solid-base catalysts", Chemical Communications, No. 18, Jan. 1, 2001, pp. 1838-1839.
Protsak, I. S, "Visosimetric study of depolymerization of polydimethylsiloxane by dimethyl carbonate", Khimichna Promislovist Ukraini (Kiev, Ukraine), Jan. 1, 2013, pp. 58-62.
Enthaler, Stephan "Iron-catalyzed depolymerization of polysiloxanes to produce dichlorodimethylsilane, diacetoxydimethylsilane, or dimethoxydimethylsilane", Journal of Applied Polymer Science, vol. 132, No. 3, Jan. 15, 2015.
Okamoto et al., "Deoligomerization of Cyclooligosiloxanes with Dimethyl Carbonate Over Solid-Base Catalysts", Catalysis Letters, vol. 88, No. 3-4, ISSN 1011-372X, 2003, pp. 115-118.

(Continued)

*Primary Examiner* — Alexander R Pagano
*Assistant Examiner* — Frank S. Hou
(74) *Attorney, Agent, or Firm* — GREENBLUM & BERNSTEIN P.L.C.

(57) ABSTRACT

Provided is a method for producing a silane compound, which does not produce corrosive substances such as acids, does not use organic solvents and which contributes to a reduction in environmental load. This method for producing a silane compound has D) a siloxane decomposition step for heating a mixture containing: a siloxane compound A), which is a cyclic siloxane compound A-1) represented by formula (1), a linear siloxane compound A-2) represented by formula (2) and/or a silsesquioxane compound that is represented by formula (3) and has a siloxane bond as a main chain skeleton; a carbonate compound B) including at least one of a diaryl carbonate, a dialkyl carbonate and a monoalkylmonoaryl carbonate; and a basic compound catalyst C). The step D) further includes subjecting the siloxane compound A) to alkoxylation and/or aryloxylation. (In the formulae, $R^1$ to $R^5$, X, n, m and p are as described in the description of the present application.)

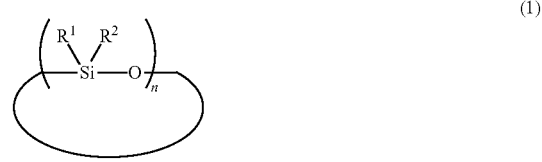

(1)

(2)

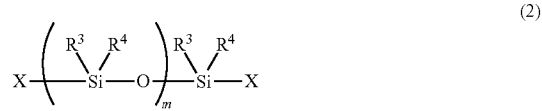

$[R^5SiO_{1.5}]p.$ (3)

17 Claims, No Drawings

(56) References Cited

OTHER PUBLICATIONS

Okamoto et al., "Polysiloxane depolymerization with dimethyl carbonate using alkali metal halide catalysts", Applied Catalysis, A: General, vol. 261, No. 2, ISSN 0926-860X, 2004, pp. 239-245.
International Search Report issued in International Pat. Appl. No. PCT/JP2020/012525, dated Jun. 16, 2020, along with an English translation thereof.
Written Opinion of the International Searching Authority issued in International Pat. Appl. No. PCT/JP2020/012525, dated Jun. 16, 2020, along with an English translation thereof.

* cited by examiner

METHOD FOR PRODUCING SILANE COMPOUND

TECHNICAL FIELD

The present invention relates to a method for producing a silane compound, and in particular, to a method for producing a silane compound such as an aryloxy silane compound or an alkoxy silane compound.

BACKGROUND ART

As a method for producing a silane compound such as a diaryloxy silane compound or a dialkoxy silane compound, a method of allowing a dihalogenated silane compound including a dichlorosilane compound as a typical example and a diacyloxy silane compound including a diacetoxy silane compound as a typical example to react with phenol derivatives or various alcohol compounds has been generally known.

For example, Patent Literature 1 discloses a process of producing dimethyldiphenoxy silane from dimethyldichlorosilane and phenol. This process needs to perform various steps such as a step of treating hydrogen chloride gas that is generated as a by-product at the same time as generation of dimethyldiphenoxy silane, a washing step of washing a product before distillation and purification with a base, and an extraction step of using an organic solvent.

In addition, since the above-described process disclosed in Patent Literature 1 also needs a waste liquid treatment step, the process causes a large environmental load.

On the other hand, Patent Literature 2 discloses a production method of obtaining dimethyldiphenoxy silane from polydimethylsiloxane and phenol. However, even in this reaction, a solvent is used, and a sufficient yield cannot be obtained.

As a method for producing a silane compound such as a triaryloxy silane compound or a trialkoxy silane compound, a method of allowing a trihalogenated silane compound including a trichlorosilane compound as a typical example to react with phenol derivatives or various alcohol compounds has been generally known.

For example, Patent Literature 3 discloses a production method of obtaining methyltriphenoxy silane from methyltrichlorosilane and phenol. Since this reaction is an equilibrium reaction, how hydrogen chloride generated as a by-product is eliminated to the outside of the reaction system becomes the rate-determining step of the reaction. As with the aforementioned diaryloxy silane compound, the triaryloxy silane compound as a desired product is unstable in an acidic aqueous solution in many cases, and thus, in order to suppress a hydrolytic reaction or a condensation reaction, a step of removing hydrogen chloride is necessary.

As mentioned above, regarding the conventional production methods, it could not be said that it is necessarily easy to produce a silane compound safely and efficiently.

PRIOR ART DOCUMENTS

Patent Documents

Patent Literature 1: US2012/184702
Patent Literature 2: JP Patent Publication (Kokai) No. 2008-297227 A
Patent Literature 3: JP Patent Publication (Kokai) No. 10-218885 A (1998)

SUMMARY OF INVENTION

Problems to be Solved by the Invention

Provided is a method for producing a silane compound such as a diaryloxy silane compound, a dialkoxy silane compound, a triaryloxy silane compound, or a trialkoxy silane compound, which does not generate corrosive substances such as hydrochloric acid or acetic acid, does not use an organic solvent, and contributes to a reduction in environmental load.

Means for Solving the Problems

The present invention relates to a method for producing a silane compound, which reduces environmental load and is capable of efficiently generating a compound of interest, as described below.

[1] A method for producing a silane compound, including, at least, any one of a diaryloxy silane compound, a dialkoxy silane compound, a monoaryloxymonoalkoxy silane compound, a triaryloxy silane compound, and a trialkoxy silane compound, wherein
the method has D) a siloxane decomposition step of heating a mixture comprising:
A) a siloxane compound(s) that are A-1) a cyclic siloxane compound represented by the following formula (1), A-2) a linear siloxane compound represented by the following formula (2), and/or a silsesquioxane compound comprising a siloxane bond as a main chain skeleton, represented by the following formula (3),
B) a carbonate compound including, at least, any one of diaryl carbonate, dialkyl carbonate, and monoalkylmonoaryl carbonate, and
C) a basic compound catalyst,
so as to alkoxylate and/or aryloxylate A) the siloxane compound(s):

[Formula 1]

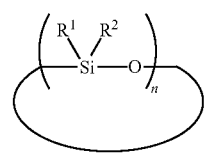
(1)

wherein $R^1$ and $R^2$ each independently represent an alkyl group, an alkenyl group, or an aryl group, each optionally having a substituent, and
n represents an integer of 3 or more and 30 or less,

[Formula 2]

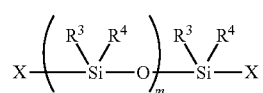
(2)

wherein $R^3$ and $R^4$ each independently represent an alkyl group, an alkenyl group, or an aryl group, each optionally having a substituent,
m represents an integer of 2 or more and 10000 or less, and X each independently represents a hydrogen atom, a hydroxyl group, an alkoxy group optionally having a substituent and having a total carbon number of 1 to 10, a hydrocarbon group optionally having a substituent, optionally having an oxygen atom or a nitrogen atom and having a total carbon number of 1 to 10, or an amino group optionally having a substituent, and

$$[R^5SiO_{1.5}]p \qquad (3)$$

wherein $R^5$ represents an alkyl group containing 1 to 4 carbon atoms, an alkenyl group containing 2 to 4 carbon atoms, or an aryl group containing 6 to 12 carbon atoms, each optionally having a substituent, and p represents an integer of 4 or more and 24 or less.

[2] A method for producing a silane compound, including, at least, any one of a diaryloxy silane compound, a dialkoxy silane compound, and a monoaryloxymonoalkoxy silane compound, wherein the method has D) a siloxane decomposition step of heating a mixture comprising:

A) a siloxane compound(s) that are A-1) a cyclic siloxane compound represented by the following formula (1), and/or A-2) a linear siloxane compound represented by the following formula (2), B) a carbonate compound including, at least, any one of diaryl carbonate, dialkyl carbonate, and monoalkylmonoaryl carbonate, and C) a basic compound catalyst, so as to alkoxylate and/or aryloxylate A) the siloxane compound(s):

[Formula 3]

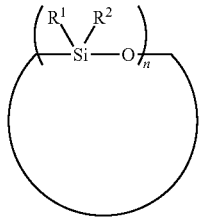

(1)

wherein $R^1$ and $R^2$ each independently represent an alkyl group, an alkenyl group, or an aryl group, each optionally having a substituent, and n represents an integer of 3 or more and 30 or less, and

[Formula 4]

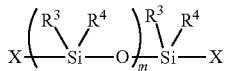

(2)

wherein $R^3$ and $R^4$ each independently represent an alkyl group, an alkenyl group, or an aryl group, each optionally having a substituent, m represents an integer of 2 or more and 10000 or less, and X each independently represents a hydrogen atom, a hydroxyl group, an alkoxy group optionally having a substituent and having a total carbon number of 1 to 10, a hydrocarbon group optionally having a substituent, optionally having an oxygen atom or a nitrogen atom and having a total carbon number of 1 to 10, or an amino group optionally having a substituent.

[3] The method for producing a silane compound according to the above [1] or [2], wherein the $R^1$ to $R^4$ each independently represent an alkyl group or an alkenyl group having a total carbon number of 1 to 8, or an aryl group having a total carbon number of 6 to 30, each optionally having a substituent.

[4] The method for producing a silane compound according to the above [3], wherein the $R^1$ to $R^4$ each independently represent any one selected from the group consisting of a methyl group, a phenyl group, a vinyl group, and a propyl group.

[5] The method for producing a silane compound according to any one of the above [1] to [4], wherein B) the diaryl carbonate includes diphenyl carbonate.

[6] The method for producing a silane compound according to any one of the above [1] to [4], wherein the number of carbon atoms contained in the alkyl group in B) the dialkyl carbonate is 4 or less.

[7] The method for producing a silane compound according to any one of the above [1] to [6], wherein C) the basic compound catalyst includes an alkali metal carbonate or an alkali metal hydroxide.

[8] The method for producing a silane compound according to the above [7], wherein C) the basic compound catalyst includes, at least, either cesium carbonate or potassium carbonate.

[9] The method for producing a silane compound according to any one of the above [1] to [8], wherein, in D) the siloxane decomposition step, the ratio x of the molar amount of B) the carbonate compound to the Si molar amount of A) the siloxane compound is $x \geq 1$.

[10] The method for producing a silane compound according to any one of the above [1] to [8], wherein, in D) the siloxane decomposition step, the ratio x of the molar amount of B) the carbonate compound to the Si molar amount of A) the siloxane compound is $0.8 < x < 1.6$.

[11] The method for producing a silane compound according to any one of the above [1] to [10], wherein, in D) the siloxane decomposition step, the ratio y of the molar ratio of C) the basic compound catalyst to the Si molar amount of A) the siloxane compound is $0.0001 \text{ mmol/mol} \leq y \leq 20 \text{ mmol/mol}$.

[12] The method for producing a silane compound according to any one of the above [1] to [11], wherein, in D) the siloxane decomposition step, the temperature applied to decompose A) the siloxane compound is 50° C. or higher and 300° C. or lower.

[13] The method for producing a silane compound according to the above [12], wherein, in D) the siloxane decomposition step, the temperature applied to decompose A) the siloxane compound is 50° C. or higher and 150° C. or lower.

[14] The method for producing a silane compound according to the above [1], wherein the molecular weight of A-1) the cyclic siloxane compound represented by the formula (1) is 2,000 or less, the molecular weight of A-2) the linear siloxane compound represented by the formula (2) is 60,000 or less, and the molecular weight of A-3) the silsesquioxane compound represented by the formula (3) is 3,500 or less.

[15] The method for producing a silane compound according to any one of the above [1] to [14], which further has E) a distillation step/a recrystallization step that is, at least, any one of a distillation step of distilling the silane compound generated by D) the siloxane decomposition step, and a recrystallization step of recrystallizing the silane compound generated by D) the siloxane decomposition step.

[16] The method for producing a silane compound according to the above [15], wherein the pressure applied in E) the distillation step is 1 hPa or more and 20 hPa or less.

[17] The method for producing a silane compound according to any one of the above [1] to [16], which further has F) a dropping step of adding A) the siloxane compound dropwise to a mixture comprising B) the carbonate compound and C) the basic compound catalyst.

Advantageous Effects of Invention

According to the method for producing a silane compound of the present invention, corrosive substances such as acids are not generated as by-products, and a silane compound can be efficiently generated, while the number of necessary steps is suppressed. Thus, according to the present invention, a method for efficiently producing a silane compound of interest, while reducing environmental load, can be provided.

Embodiments for Carrying Out the Invention

The method for producing a silane compound of the present invention has a siloxane decomposition step of heating a mixture comprising:

A) a cyclic siloxane compound, a linear siloxane compound, and/or a silsesquioxane compound, which will be described in detail later, B) a carbonate compound including, at least, any one of diaryl carbonate, dialkyl carbonate, and monoalkylmonoaryl carbonate, and C) a basic compound catalyst, so as to alkoxylate and/or aryloxylate A) the siloxane compound(s).

According to the production method of the present invention, a silane compound that is, at least, any one of a diaryloxy silane compound, a dialkoxy silane compound, a monoaryloxymonoalkoxy silane compound, a triaryloxy silane compound, and a trialkoxy silane compound is produced.

Hereinafter, the method for producing a silane compound according to the present invention will be described in detail.

A) Siloxane Compound

A-1) Cyclic Siloxane Compound

Among the siloxane compounds used in the siloxane decomposition step, a cyclic siloxane compound is represented by the following formula (1):

[Formula 5]

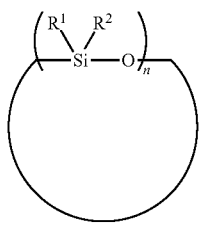

(1)

In the formula (1), $R^1$ and $R^2$ each independently represent an alkyl group, an alkenyl group, or an aryl group, each optionally having a substituent. The $R^1$ and $R^2$ in the formula (1) each preferably represent an alkyl group or an alkenyl group having a total carbon number of 1 to 8, or an aryl group having a total carbon number of 6 to 30, each of which optionally has a substituent.

When the $R^1$ and $R^2$ are each an alkyl group optionally having a substituent or alkenyl group optionally having a substituent, the total carbon number is preferably 1 to 6, more preferably 1 to 4, and particularly preferably 1 or 2.

On the other hand, when the $R^1$ and $R^2$ are each an aryl group optionally having a substituent, the total carbon number is preferably 6 to 20, more preferably 6 to 12, and particularly preferably 6 to 8.

The aforementioned substituent includes a hydroxyl group, halogen, an amino group, a vinyl group, a carboxyl group, a cyano group, a (meth)acryloxy group, a glycidyloxy group, and a mercapto group.

Preferred specific examples of the $R^1$ and $R^2$ in the formula (1) may include a methyl group, a phenyl group, a vinyl group, and a propyl group.

In the formula (1), n represents an integer of 3 or more and 30 or less. The n value in the formula (1) is preferably 3 or more and 15 or less, more preferably 3 or more and 10 or less, further preferably 3 or more and 8 or less, and particularly preferably 3 or more and 5 or less.

In addition, the cyclic siloxane compound represented by the formula (1) may also be a mixture of cyclic siloxane compounds each having a different n value, a mixture of cyclic siloxane compounds each having a different molecular structure, and a mixture of cyclic siloxane compounds each having a different n value and a different molecular structure.

The molecular weight of the cyclic siloxane compound represented by the formula (1) is preferably 2,000 or less, more preferably 1,600 or less, further preferably 1,200 or less, and particularly preferably 1,000 or less. On the other hand, the molecular weight of the cyclic siloxane compound represented by the formula (1) is, for example, 100 or more, preferably 150 or more, and more preferably 200 or more.

A-2) Linear Siloxane Compound

Among the siloxane compounds used in the siloxane decomposition step, a linear siloxane compound is represented by the following formula (2):

[Formula 6]

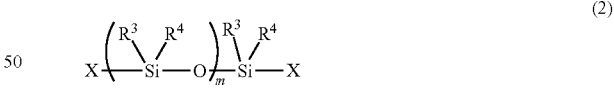

(2)

In the formula (2), $R^3$ and $R^4$ each independently represent an alkyl group, an alkenyl group, or an aryl group, each optionally having a substituent. The $R^3$ and $R^4$ in the formula (2) each preferably represent an alkyl group or an alkenyl group having a total carbon number of 1 to 8, or an aryl group having a total carbon number of 6 to 30, each of which optionally has a substituent.

When the $R^3$ and $R^4$ are each an alkyl group optionally having a substituent or an alkenyl group optionally having a substituent, the total carbon number is preferably 1 to 6, more preferably 1 to 4, and particularly preferably 1 or 2.

On the other hand, the $R^3$ and $R^4$ are each an aryl group optionally having a substituent, the total carbon number is preferably 6 to 20, more preferably 6 to 12, and particularly preferably 6 to 8.

The aforementioned substituent includes a hydroxyl group, halogen, an amino group, a vinyl group, a carboxyl group, a cyano group, a (meth)acryloxy group, a glycidyloxy group, and a mercapto group.

Preferred specific examples of the $R^3$ and $R^4$ in the formula (2) may include a methyl group, a phenyl group, a vinyl group, and a propyl group.

In the formula (2), m represents an integer of 2 or more and 10,000 or less. The m value in the formula (2) is preferably 10 or more and 7,000 or less, more preferably 20 or more and 2,000 or less, further preferably 30 or more and 1,000 or less, and particularly preferably 40 or more and 800 or less.

In addition, the linear siloxane compound represented by the formula (2) may also be a mixture of linear siloxane compounds each having a different m value, a mixture of linear siloxane compounds each having a different molecular structure, and a mixture of linear siloxane compounds each having a different m value and a different molecular structure.

In the formula (2), X each independently represents a hydrogen atom, a hydroxyl group, an alkoxy group optionally having a substituent and having a total carbon number of 1 to 10, a hydrocarbon group optionally having a substituent, optionally having an oxygen atom or a nitrogen atom and having a total carbon number of 1 to 10, or an amino group optionally having a substituent. X each independently represents: preferably, any one of a hydrogen atom, a hydroxyl group, an alkoxy group optionally having a substituent and having a total carbon number of 1 to 10, and an alkyl group optionally having a substituent, optionally having an oxygen atom or a nitrogen atom and having a total carbon number of 1 to 10; more preferably, a hydroxyl group, or an alkyl group optionally having a substituent and having a total carbon number of 1 to 10; and further preferably, a hydroxyl group, or an alkyl group having a total carbon number of 1 to 5.

The substituents for the aforementioned X include a hydroxyl group, halogen, an amino group, a vinyl group, a carboxyl group, a cyano group, a (meth)acryloxy group, a glycidyloxy group, and a mercapto group.

The molecular weight of the linear siloxane compound represented by the formula (2) is preferably 60,000 or less, more preferably 56,000 or less, further preferably 50,000 or less, and particularly preferably 45,000 or less. On the other hand, the molecular weight of the linear siloxane compound represented by the formula (2) is, for example, 1,000 or more, preferably 2,000 or more, and more preferably 3,000 or more.

A-3) Silsesquioxane Compound

Among the siloxane compounds used in the siloxane decomposition step, a silsesquioxane compound is a siloxane-based compound having a siloxane bond (Si—O—Si bond) as a main chain skeleton, and is represented by the following formula (3):

$$[R^5SiO_{1.5}]p \text{ (or the formula } [R^5SiO_{3/2}]p) \tag{3}$$

As such a silsesquioxane represented by the formula (3), for example, a ladder type, a net type, a basket type, a random type, and the like is used. Among these, from the viewpoint of solubility in a carbonate compound, a basket type silsesquioxane is preferable. The basket type silsesquioxane is, for example, the one represented by the following formula (3') (wherein R in the formula (3') represents the same substituents as those for the following $R^5$):

[Formula 7]

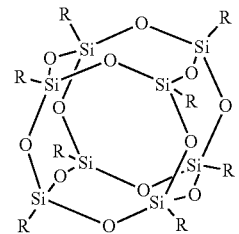

(3')

In the formula (3), $R^5$ represents an alkyl group containing 1 to 4 carbon atoms, an alkenyl group containing 2 to 4 carbon atoms, or an aryl group containing 6 to 12 carbon atoms, each optionally having a substituent.

Preferably, the $R^5$ in the formula (3) represents an alkyl group having a total carbon number of 1 or 2, an alkenyl group having a total carbon number of 2 or 3, or an aryl group having a total carbon number of 6 to 10, each optionally having a substituent. Moreover, when the $R^5$ is an aryl group optionally having a substituent, the total carbon number thereof is more preferably 6 to 8.

The aforementioned substituent includes a hydroxyl group, halogen, an amino group, a vinyl group, a carboxyl group, a cyano group, a (meth)acryloxy group, a glycidyloxy group, and a mercapto group.

Preferred specific examples of the $R^5$ in the formula (3) may include a methyl group, a phenyl group, a vinyl group, and a propyl group.

In the formula (3), p represents an integer of 4 or more and 24 or less. The p value in the formula (3) is preferably 5 or more and 20 or less, more preferably 6 or more and 18 or less, further preferably 8 to 14, and particularly preferably 8, 10, 12 or 14. It is preferable that the silsesquioxane of the formula (3) has the aforementioned p value and is a basket type silsesquioxane.

Moreover, the silsesquioxane compound represented by the formula (3) may also be a mixture of silsesquioxane compounds each having a different p value, a mixture of silsesquioxane compounds each having a different molecular structure, and a mixture of silsesquioxane compounds each having a different p value and a different molecular structure.

In the silsesquioxane compound represented by the formula (3), the type of the $R^5$ as a substituent and the molecular weight of the silsesquioxane compound have the relationship shown in the table below. As mentioned above, since the silsesquioxane compound represented by the formula (3) preferably has a p value of 8 to 14, a preferred range of the molecular weight of the silsesquioxane compound of the formula (3) having a representative substituent is determined.

That is to say, the molecular weight of the silsesquioxane compound represented by the formula (3) is preferably 3,500 or less, more preferably 3,100 or less, further preferably 1,900 or less, still further preferably 1,600 or less, and particularly preferably 1,300 or less. On the other hand, the molecular weight of the silsesquioxane compound represented by the formula (3) is, for example, 100 or more, preferably 150 or more, more preferably 200 or more, and further preferably 250 or more.

TABLE 1

| p Value in formula (3) | Substituent $R^5$ in formula (3) | |
|---|---|---|
| | Phenyl group | Methyl group |
| 4 | 516 | 268 |
| 8 | 1033 | 537 |
| 10 | 1291 | 671 |
| 12 | 1549 | 805 |
| 14 | 1807 | 939 |
| 24 | 3098 | 1610 |

Among the cyclic siloxane compound represented by the formula (1), the linear siloxane compound represented by the formula (2) and the silsesquioxane compound represented by the formula (3), which are described above, any one siloxane compound may be used alone, or any one of the cyclic siloxane compound, the linear siloxane compound and the silsesquioxane compound may be used as a mixture. These siloxane compounds can be synthesized by a known method. Otherwise, a commercially available product may also be used as such a siloxane compound.

Besides, the cyclic siloxane compound represented by the formula (1) and the linear siloxane compound represented by the formula (2) are preferably used in the production of a silane compound that is any one of a diaryloxy silane compound, a dialkoxy silane compound, and a monoaryloxymonoalkoxy silane compound. On the other hand, the silsesquioxane compound represented by the formula (3) is preferably used in the production of, at least, either a triaryloxy silane compound or a trialkoxy silane compound.

B) Carbonate Compound

As a carbonate compound used in the siloxane decomposition step, at least, any one of diaryl carbonate, dialkyl carbonate, and monoalkylmonoaryl carbonate is used.

Diaryl carbonate and monoalkylmonoaryl carbonate preferably have an aryl group having a total carbon number of 6 to 30. The total carbon number of the aryl group is more preferably 6 to 20, further preferably 6 to 12, and particularly preferably 6 to 8.

A preferred specific example of the aforementioned aryl group may be a phenyl group. When the diaryl carbonate is used as a carbonate compound, it preferably comprises, at least, diphenyl carbonate.

Moreover, dialkyl carbonate and monoalkylmonoaryl carbonate used as carbonate compounds have an alkyl group having a total carbon number of preferably 1 to 8, more preferably 1 to 6, and further preferably 1 to 4, namely, 4 or less.

Besides, the aforementioned carbonate compound can be synthesized by a known method. Otherwise, a commercially available product may also be used as such a carbonate compound.

C) Basic Compound Catalyst

The basic compound catalyst used in the siloxane decomposition step includes an alkali metal compound and an alkaline-earth metal compound. Examples of such a compound used herein may include organic acid salts such as alkali metal and alkaline-earth metal compounds, inorganic salts, oxides, hydroxides, hydrides or alkoxides, quaternary ammonium hydroxide and a salt thereof, and amines. These compounds can be used alone or in combination of multiple types. The basic compound catalyst more preferably comprises an alkali metal carbonate or an alkali metal hydroxide for an efficient reaction in the siloxane decomposition step.

Preferred specific examples of the basic compound catalyst may include cesium carbonate, potassium carbonate, sodium carbonate, sodium hydrogen carbonate, cesium hydroxide, potassium hydroxide, and sodium hydroxide.

Besides, the aforementioned basic compound catalyst can be prepared according to a known method, or a commercially available product may be used as such a basic compound catalyst. In addition, the basic compound catalyst may be added in the form of an aqueous solution into the reaction system, or may also be added in the form of powders into the reaction system.

D) Siloxane Decomposition Step

In the siloxane decomposition step, a mixture comprising A) the above-described cyclic siloxane compound and/or linear siloxane compound and B) the above-described carbonate compound is heated in the presence of C) the above-described basic compound catalyst, so that A) the above-described siloxane compound(s) are alkoxylated and/or aryloxylated, thereby decomposing siloxane. Thus, as a result of the siloxane decomposition reaction of A) the above-described siloxane compound(s), a silane compound, into which the aryl group and/or alkyl group of B) the above-described carbonate compound have been introduced, is generated.

In the siloxane decomposition step, when B) the above-described carbonate compound is diaryl carbonate, the generated silane compound is a diaryloxy silane compound. When B) the above-described carbonate compound is dialkyl carbonate, the generated silane compound is a dialkoxy silane compound. When the B) the above-described carbonate compound is monoalkylmonoaryl carbonate, the generated silane compound is a monoaryloxymonoalkoxy silane compound.

For example, when B) the above-described carbonate compound is diphenyl carbonate and A) the above-described cyclic siloxane compound is decamethylcyclopentasiloxane, the siloxane decomposition reaction is shown in the following formula (4), and dimethyldiphenoxy silane (hereinafter also referred to as "DMDPS") is obtained as a main product.

[Formula 8]

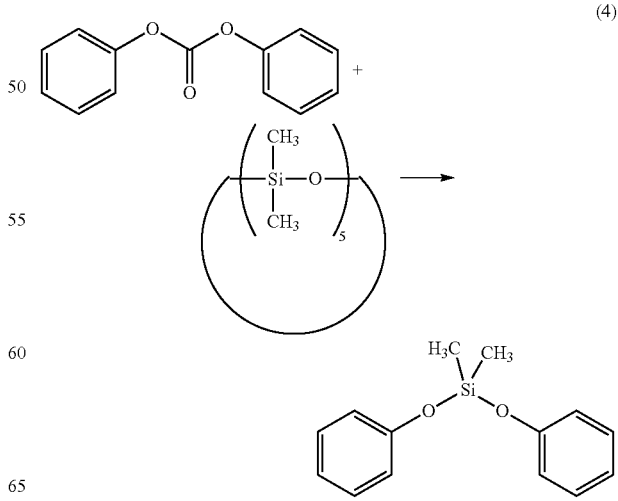

The above formula (4) schematically shows the siloxane decomposition reaction, and thus, a by-product that may be generated in a small amount is omitted. The molar ratio among diphenyl carbonate, decamethylcyclopentasiloxane and dimethyldiphenoxy silane is not adjusted.

In the siloxane decomposition step, in order to promote the decomposition reaction of the siloxane compound, the molar amount of B) the above-described carbonate compound is preferably equal to or greater than the Si molar amount of A) the above-described siloxane compound, namely, the molar amount of silicon atoms in the siloxane compound. That is, the ratio x of the molar amount of B) the carbonate compound to the Si molar amount of A) the siloxane compound (i.e., the value of the Si molar amount of A) the siloxane compound/B) the molar amount of the carbonate compound) preferably satisfies x≥1. In addition, the molar amount of the carbonate compound may be 1.1 times or more the Si molar amount of the siloxane compound (x>1.1), and for example, the molar amount of the carbonate compound may be approximately 1.5 times the Si molar amount of the siloxane compound.

Moreover, for an efficient decomposition reaction of the siloxane compound, the above-described ratio x is preferably 0.8<x<2.0, more preferably 0.8<x<1.8, further preferably 0.8<x<1.6, and particularly preferably 0.9<x<1.5. In this case, the residual amount of the siloxane compound used as a raw material, which is unreacted and remains, can be suppressed.

Besides, the value of the above-described ratio x can be adjusted depending on the type of the siloxane compound used as a raw material.

For example, when the aforementioned A-1) cyclic siloxane compound or A-2) linear siloxane compound is used as a raw material, since the ideal ratio between the molar amount of the carbonate compound and the Si molar amount of the siloxane compound is 1:1, the value of the above described ratio x may be approximately 0.8<x<1.2, and preferably approximately 0.9<x<1.1. On the other hand, when the aforementioned A-3) silsesquioxane compound is used as a raw material, since the ideal ratio between the molar amount of the carbonate compound and the Si molar amount of the siloxane compound is 1:1.5, the value of the above described ratio x may be approximately 1.0<x<1.8, and preferably approximately 1.3<x<1.7.

In the siloxane decomposition step, from the viewpoint of the efficiency of the decomposition reaction and suppression of the excessive use of the catalyst, the ratio y of C) the above-described basic compound catalyst to the Si molar amount of A) the above-described siloxane compound (i.e., the value of the molar amount of C) the basic compound catalyst/the Si molar amount of A) the siloxane compound) is preferably 0.0001 mmol/mol≤y≤20 mmol/mol (wherein the y value is 0.0001 mmol/mol or more and 20 mmol/mol or less), more preferably 0.001 mmol/mol≤y≤15 mmol/mol (wherein the y value is 0.001 mmol/mol or more and 15 mmol/mol or less), further preferably 0.1 mmol/mol≤y≤8 mmol/mol (wherein the y value is 0.1 mmol/mol or more and 8 mmol/mol or less), and particularly preferably 1 mmol/mol≤y≤5 mmol/mol (wherein the y value is 1 mmol/mol or more and 5 mmol/mol or less).

From the viewpoint of the efficiency of the decomposition reaction and the yield, the temperature applied to the siloxane decomposition reaction in the siloxane decomposition step, namely, the temperature for decomposing A) the siloxane compound may be preferably 50° C. or higher and 300° C. or lower, and more preferably 50° C. or higher and 150° C. or lower. The temperature applied in the siloxane decomposition step is more preferably 70° C. or higher and 250° C. or lower, further preferably 80° C. or higher and 240° C. or lower, and particularly preferably 90° C. or higher and 220° C. or lower.

The siloxane decomposition reaction in the siloxane decomposition step can be progressed under normal pressure, and the adjustment of the pressure by pressurization or pressure reduction is unnecessary.

E) Distillation Step/Recrystallization Step

In order to improve the purity of a silane compound, it is preferable that the method for producing a silane compound of the present invention further has, at least, any one of a distillation step of distilling a silane compound generated as a result of the siloxane decomposition step, and a recrystallization step of recrystallizing a silane compound generated as a result of the siloxane decomposition step.

For efficient distillation, the pressure applied in the distillation step is preferably 1 hPa or more and 20 hPa or less, more preferably 2 hPa or more and 10 hPa or less, and further preferably 3 hPa or more and 5 hPa or less.

In addition, for efficient distillation, the temperature applied in the distillation step is preferably 50° C. or higher and 300° C. or lower, more preferably 70° C. or higher and 250° C. or lower, further preferably 100° C. or higher and 200° C. or lower, and particularly preferably 120° C. or higher and 180° C. or lower.

In the recrystallization step, a recrystallization solvent is selected and used, depending on the properties of the generated silane compound, such as, in particular, solubility. From the viewpoint of the solubility of a product therein, the recrystallization solvent is preferably heptane, octane, toluene, benzene, cyclohexane, hexane, or the like. Moreover, it is preferable that the silane compound is dissolved in the solvent at a temperature of 50° C. or higher and 120° C. or lower, and that the solution is then cooled at a rate of 0.5° C./min or more and 1° C./min or less.

F) Dropping Step

In the method for producing a silane compound, it is preferable that raw materials other than A) the siloxane compound have previously been mixed with a catalyst, and that A) the siloxane compound is added dropwise to the obtained mixture, mainly, the mixed solution. Thus, by further establishing F) a dropping step of gradually adding A) the siloxane compound dropwise to a mixture comprising, at least, B) the carbonate compound and C) the basic compound catalyst, the safety of the method for producing a silane compound can be further enhanced.

The speed of dropping A) the siloxane compound in F) the dropping step is also adjusted by the reaction scale, and it is approximately 0.1 ml/min to 10 L (litter)/min, preferably 1.0 ml/min to 7.0 L/min, more preferably 10 ml/min to 5.0 L/min, and particularly preferably 100 ml/min to 1.0 L/min. Otherwise, the speed of dropping A) the siloxane compound may be, for example, approximately 1 to 100 ml/min.

For example, in the case of using approximately 250 g of diphenyl carbonate, it is preferable that approximately 0.23 mol siloxane compound is added at a dropping speed of approximately 1 ml/min, and that the total dropping time is approximately 90 minutes. The optimal dropping speed applied in F) the dropping step is different depending on the reaction scale. However, the preferred total dropping time is not fluctuated so much, and it is preferably approximately 30 minutes to 3 hours, more preferably approximately 1 hour to 2 hours, and it is, for example, approximately 90 minutes.

Alternatively, A) the siloxane compound is dissolved in a suitable solvent, so that the dropping speed may be easily adjusted.

A) The siloxane compound is gradually added to a mixture comprising B) the carbonate compound and C) the basic compound catalyst, in general, to a mixed solution further comprising a solvent, so that rapid generation of $CO_2$ can be suppressed and the safety can be improved. Moreover, also in the process of producing a silane compound at an industrial scale, by adopting such a dropping step, rapid pressurization in the reaction tank caused by $CO_2$ as a by-product can be prevented, and the safety can be enhanced.

EXAMPLES

Evaluation Item

NMR: The chemical shift in the following $^1$H-NMR analyses was based on 7.24 ppm that is a peak of $CDCl_3$.

Example 1

Decamethylcyclopentasiloxane (7.5 g; 20.2 mmol; Si molar amount: 101.0 mmol), diphenyl carbonate (21.6 g; 101.0 mmol), and cesium carbonate used as a catalyst (33 mg; 0.1 mmol) were substituted in a nitrogen atmosphere, and were then stirred at 200° C. for 60 minutes.

Thereafter, the reaction mixture was analyzed by $^1$H-NMR. As a result, a methyl proton peak on silicon that was based on the decamethylcyclopentasiloxane was not observed, and the conversion percentage of the decamethylcyclopentasiloxane was confirmed to be 100%.

Subsequently, the reaction mixture was cooled to 40° C., and was then subjected to reduced-pressure distillation at a degree of pressure reduction of 4 hPa and at 150° C., so as to obtain 23.7 g of a colorless oily component.

The obtained oily component was analyzed by $^1$H-NMR. As a result, as methyl proton peaks on silicon, a peak of 0.378 ppm based on dimethyldiphenoxy silane (DMDPS) and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the peak area ratio, and as a result, it was 98.6:1.4.

The yield of the molar amount of dimethyldiphenoxy silane obtained from the weight of the obtained oily component and the above-described molar ratio was 96.0%, with respect to the molar amount of silicon atoms contained in the decamethylcyclopentasiloxane.

Dimethyldiphenoxy silane ($^1$H-NMR (CDCl$_3$, 500 MHz, δ; ppm)=0.378 (s; 6H), 6.942, 6.944 (d; 4H), 6.959, 6.961, 6.995 (t; 2H), 7.230, 7.245, 7.257 (t; 4H)).

It is to be noted that the siloxane decomposition reaction performed in the present example is represented by the following formula (4-1), and that 1,1,3,3-tetramethyl-1,3-diphenoxydisiloxane was obtained as a by-product, as well as DMDPS as a main product.

[Formula 9]

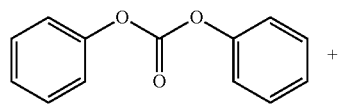

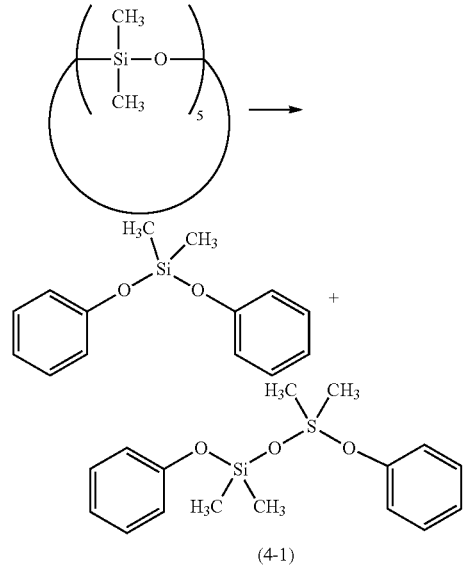

(4-1)

Example 2

Decamethylcyclopentasiloxane (7.4 g; 20.0 mmol; Si molar amount: 100.0 mmol), diphenyl carbonate (23.6 g; 110.0 mmol), and cesium carbonate used as a catalyst (33 mg; 0.1 mmol) were substituted in a nitrogen atmosphere, and were then stirred at 200° C. for 60 minutes.

Thereafter, the reaction mixture was analyzed by $^1$H-NMR. As a result, a methyl proton peak on silicon that was based on the decamethylcyclopentasiloxane was not observed, and the conversion percentage of the decamethylcyclopentasiloxane was confirmed to be 100%.

Subsequently, the reaction mixture was cooled to 40° C., and was then subjected to reduced-pressure distillation at a degree of pressure reduction of 4 hPa and at 150° C., so as to obtain 25.1 g of a colorless oily component.

The obtained oily component was analyzed by $^1$H-NMR. As a result, as methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the peak area ratio, and as a result, it was 99.8:0.2. In addition, a proton peak at a meta position of the carbonate group based on the diphenyl carbonate was also observed at 7.406 ppm.

The yield of the molar amount of dimethyldiphenoxy silane, which was obtained by subtracting the weight of diphenyl carbonate calculated from the peak area derived from the mixed diphenyl carbonate, from the weight of the obtained oily component, and then using the above-described molar ratio, was 97.7%, with respect to the molar amount of silicon atoms contained in the decamethylcyclopentasiloxane.

Example 3

Decamethylcyclopentasiloxane (7.4 g; 20.0 mmol; Si molar amount: 100.0 mmol), diphenyl carbonate (32.1 g; 150.0 mmol), and cesium carbonate used as a catalyst (33 mg; 0.1 mmol) were substituted in a nitrogen atmosphere, and were then stirred at 200° C. for 60 minutes.

Thereafter, the reaction mixture was analyzed by ¹H-NMR. As a result, a methyl proton peak on silicon that was based on the decamethylcyclopentasiloxane was not observed, and the conversion percentage of the decamethylcyclopentasiloxane was confirmed to be 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the peak area ratio, and as a result, it was 98.8:1.2.

Example 4

Decamethylcyclopentasiloxane (7.4 g; 20.0 mmol; Si molar amount: 100.0 mmol), diphenyl carbonate (19.3 g; 90.0 mmol), and cesium carbonate used as a catalyst (33 mg; 0.1 mmol) were substituted in a nitrogen atmosphere, and were then stirred at 200° C. for 60 minutes.

Thereafter, the reaction mixture was analyzed by ¹H-NMR. As a result, a methyl proton peak on silicon that was based on the decamethylcyclopentasiloxane was not observed, and the conversion percentage of the decamethylcyclopentasiloxane was confirmed to be 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the peak area ratio, and as a result, it was 93.2:6.8.

Example 5

Octaphenylcyclotetrasiloxane represented by the following formula (5) (melting point: 197° C.; molecular weight: 793.17) (14.9 g; 18.8 mmol; Si molar amount: 75.0 mmol), diphenyl carbonate (16.1 g; 75.0 mmol), and cesium carbonate used as a catalyst (33 mg; 0.1 mmol) were substituted in a nitrogen atmosphere, and were then stirred at 200° C. for 10 minutes.

[Formula 10]

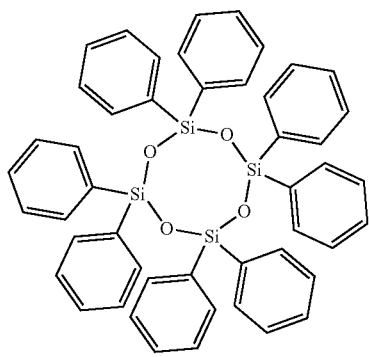

(5)

Thereafter, the reaction mixture was analyzed by ¹H-NMR. As a result, a proton peak at a para position of the octaphenylcyclotetrasiloxane was not observed, and the conversion percentage of the octaphenylcyclotetrasiloxane was confirmed to be 100%.

To the reaction mixture that had been cooled to room temperature and had been then solidified, 20 g of heptane was added, and the obtained mixture was heated to 90° C., followed by hot filtration. The obtained filtrate was left at room temperature for 3 days, so that a white crystal was precipitated. Thereafter, 10 g of heptane cooled to 5° C. was further added to the crystal, and the obtained mixture was filtrated. The thus obtained crystal was removed from the filter paper, and was then dried at 40° C., at a degree of pressure reduction of 1 hPa for 45 hours, so as to obtain 24.1 g of white powders. The obtained powders were analyzed by ¹H-NMR. As a result, peaks derived from diphenyldiphenoxy silane and 1,3-diphenoxy-1,1,3,3-tetraphenyldisiloxane were observed. The molar ratio between dimethyldiphenoxy silane and 1,3-diphenoxy-1,1,3,3-tetraphenyldisiloxane was obtained from the peak area ratio, and as a result, it was 95.4:4.6.

The yield of the molar amount of diphenyldiphenoxy silane, which was obtained from the weight of the obtained white powders and the above-described molar ratio, was 81.1%, with respect to the molar amount of silicon atoms contained in the octaphenylcyclotetrasiloxane.

Diphenyldiphenoxy silane (¹H-NMR (CDCl 3,500 MHz, 6; ppm)=6.915, 6.927, 6.939, 6.952, 6.965 (p; 6H), 7.142, 7.155, 7.169 (t; 4H), 7.354, 7.366, 7.379 (t; 4H), 7.425, 7.437, 7.449 (t; 2H)), 7.750, 7.762 (d; 4H).

Example 6

Octaphenylcyclotetrasiloxane (14.9 g; 18.8 mmol; Si molar amount: 75.0 mmol), diphenyl carbonate (16.9 g; 78.8 mmol), and cesium carbonate used as a catalyst (33 mg; 0.1 mmol) were substituted in a nitrogen atmosphere, and were then stirred at 200° C. for 10 minutes.

Thereafter, the reaction mixture was analyzed by ¹H-NMR. As a result, a proton peak at a para position of the octaphenylcyclotetrasiloxane was not observed, and the conversion percentage of the octaphenylcyclotetrasiloxane was confirmed to be 100%.

To the reaction mixture that had been cooled to room temperature and had been then solidified, 20 g of heptane was added, and the obtained mixture was heated to 90° C., followed by hot filtration. The obtained filtrate was left at room temperature for 3 days, so that a white crystal was precipitated. Thereafter, 10 g of heptane cooled to 5° C. was further added to the crystal, and the obtained mixture was filtrated. The thus obtained crystal was removed from the filter paper, and was then dried at 40° C., at a degree of pressure reduction of 1 hPa for 45 hours, so as to obtain 24.4 g of white powders.

The obtained powders were analyzed by ¹H-NMR. As a result, peaks derived from diphenyldiphenoxy silane and 1,3-diphenoxy-1,1,3,3-tetraphenyldisiloxane were observed. The molar ratio between dimethyldiphenoxy silane and 1,3-diphenoxy-1,1,3,3-tetraphenyldisiloxane was obtained from the peak area ratio, and as a result, it was 99.5:0.5.

The yield of the molar amount of diphenyldiphenoxy silane, which was obtained from the weight of the obtained white powders and the above-described molar ratio, was 87.6%, with respect to the molar amount of silicon atoms contained in the octaphenylcyclotetrasiloxane.

Example 7

Octaphenylcyclotetrasiloxane (14.9 g; 18.8 mmol; Si molar amount: 75.0 mmol), diphenyl carbonate (17.7 g; 82.6 mmol), and cesium carbonate used as a catalyst (33 mg; 0.1 mmol) were substituted in a nitrogen atmosphere, and were then stirred at 200° C. for 60 minutes.

Thereafter, the reaction mixture was analyzed by $^1$H-NMR. As a result, a proton peak at a para position of the octaphenylcyclotetrasiloxane was not observed, and the conversion percentage of the octaphenylcyclotetrasiloxane was confirmed to be 100%.

To the reaction mixture that had been cooled to room temperature and had been then solidified, 20 g of heptane was added, and the obtained mixture was heated to 90° C., followed by hot filtration. The obtained filtrate was left at room temperature for 3 days, so that a white crystal was precipitated. Thereafter, 10 g of heptane cooled to 5° C. was further added to the crystal, and the obtained mixture was filtrated. The thus obtained crystal was removed from the filter paper, and was then dried at 40° C., at a degree of pressure reduction of 1 hPa for 45 hours, so as to obtain 23.1 g of white powders.

The obtained powders were analyzed by $^1$H-NMR. As a result, peaks derived from diphenyldiphenoxy silane and 1,3-diphenoxy-1,1,3,3-tetraphenyldisiloxane were observed. The molar ratio between dimethyldiphenoxy silane and 1,3-diphenoxy-1,1,3,3-tetraphenyldisiloxane was obtained from the peak area ratio, and as a result, it was 99.6:0.4.

The yield of the molar amount of diphenyldiphenoxy silane, which was obtained from the weight of the obtained white powders and the above-described molar ratio, was 83.1%, with respect to the molar amount of silicon atoms contained in the octaphenylcyclotetrasiloxane.

Example 8

Dimethylpolysiloxane represented by the following formula (6) (with a hydroxy terminal treatment; molecular weight: 4,200) (7.4 g; 1.8 mmol; Si molar amount: 100.0 mmol), diphenyl carbonate (21.4 g; 100.0 mmol), and cesium carbonate used as a catalyst (65 mg; 0.2 mmol) were substituted in a nitrogen atmosphere, and were then stirred at 220° C. for 30 minutes.

[Formula 11]

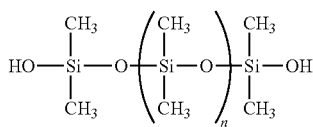

(6)

Thereafter, the reaction mixture was analyzed by $^1$H-NMR. As a result, a proton peak based on the dimethylpolysiloxane was not observed, and the conversion percentage of the dimethylpolysiloxane was confirmed to be 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the peak area ratio, and as a result, it was 95.0:5.0.

Example 9

Dimethylpolysiloxane represented by the following formula (7) (manufactured by Shin-Etsu Chemical Co., Ltd.; KF-96-3000cs; trimethylsiloxy terminus; molecular weight: 40,000) (7.4 g; 0.19 mmol; Si molar amount: 100.0 mmol), diphenyl carbonate (21.4 g; 100.0 mmol), and cesium carbonate used as a catalyst (33 mg; 0.1 mmol) were substituted in a nitrogen atmosphere, and were then stirred at 200° C. for 60 minutes.

[Formula 12]

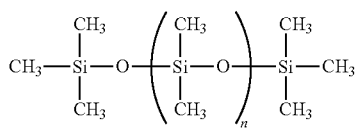

(7)

Thereafter, the reaction mixture was analyzed by $^1$H-NMR. As a result, a proton peak based on the dimethylpolysiloxane was not observed, and the conversion percentage of the dimethylpolysiloxane was confirmed to be 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the peak area ratio, and as a result, it was 98.1:1.9.

Example 10

Decamethylcyclopentasiloxane (7.4 g; 20.0 mmol; Si molar amount: 100.0 mmol), dibutyl carbonate (17.4 g; 100.0 mmol), and cesium carbonate used as a catalyst (33 mg; 0.1 mmol) were substituted in a nitrogen atmosphere, and were then stirred at 200° C. for 60 minutes.

Thereafter, the reaction mixture was analyzed by $^1$H-NMR. As a result, as methyl proton peaks on silicon, a peak of 0.055 ppm based on decamethylcyclopentasiloxane and a peak of 0.070 ppm based on dimethyldibutoxy silane were observed. The conversion percentage of the decamethylcyclopentasiloxane calculated from the ratio of the two peak areas was 69%.

Example 11

Decamethylcyclopentasiloxane (7.4 g; 20.0 mmol; Si molar amount: 100.0 mmol), diphenyl carbonate (21.4 g; 100.0 mmol), and cesium carbonate used as a catalyst (33 mg; 0.1 mmol) were substituted in a nitrogen atmosphere, and were then stirred at 150° C. for 60 minutes.

Thereafter, the reaction mixture was analyzed by $^1$H-NMR. As a result, as methyl proton peaks on silicon, a peak of 0.055 ppm based on decamethylcyclopentasiloxane and a peak of 0.378 ppm based on dimethyldiphenoxy silane were observed. The conversion percentage of the decamethylcyclopentasiloxane calculated from the ratio of the two peak areas was 71%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were observed. The molar ratio between dimethyldiphenoxy silane and 1,1,3,3-tetramethyl-1,3-diphenoxydisiloxane was obtained from the ratio of the two peak areas, and as a result, it was 78.7:21.3.

Example 12

Decamethylcyclopentasiloxane (7.4 g; 20.0 mmol; Si molar amount: 100.0 mmol), diphenyl carbonate (21.4 g; 100.0 mmol), and cesium carbonate used as a catalyst (65 mg; 0.2 mmol) were substituted in a nitrogen atmosphere, and were then stirred at 220° C. for 30 minutes.

Thereafter, the reaction mixture was analyzed by $^1$H-NMR. As a result, a methyl proton peak on silicon that was based on the decamethylcyclopentasiloxane was not observed, and the conversion percentage of the decamethylcyclopentasiloxane was confirmed to be 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the peak area ratio, and as a result, it was 99.6:0.4.

Example 13

Decamethylcyclopentasiloxane (7.4 g; 20.0 mmol; Si molar amount: 100.0 mmol), diphenyl carbonate (21.4 g; 100.0 mmol), and potassium carbonate used as a catalyst (28 mg; 0.2 mmol) were substituted in a nitrogen atmosphere, and were then stirred at 220° C. for 30 minutes.

Thereafter, the reaction mixture was analyzed by $^1$H-NMR. As a result, a methyl proton peak on silicon that was based on the decamethylcyclopentasiloxane was not observed, and the conversion percentage of the decamethylcyclopentasiloxane was 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the peak area ratio, and as a result, it was 99.7:0.3.

Example 14

Decamethylcyclopentasiloxane (7.4 g; 20.0 mmol; Si molar amount: 100.0 mmol), diphenyl carbonate (21.4 g; 100.0 mmol), and sodium carbonate used as a catalyst (21 mg; 0.2 mmol) were substituted in a nitrogen atmosphere, and were then stirred at 220° C. for 30 minutes.

Thereafter, the reaction mixture was analyzed by $^1$H-NMR. As a result, as methyl proton peaks on silicon, a peak of 0.055 ppm based on decamethylcyclopentasiloxane and a peak of 0.378 ppm based on dimethyldiphenoxy silane were observed. The conversion percentage of the decamethylcyclopentasiloxane calculated from the ratio of the two peak areas was 89%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were observed. The molar ratio between dimethyldiphenoxy silane and 1,1,3,3-tetramethyl-1,3-diphenoxydisiloxane was obtained from the ratio of the two peak areas, and as a result, it was 94.3:5.7.

Example 15

Decamethylcyclopentasiloxane (7.4 g; 20.0 mmol; Si molar amount: 100.0 mmol), diphenyl carbonate (21.4 g; 100.0 mmol), and sodium hydrogen carbonate used as a catalyst (17 mg; 0.2 mmol) were substituted in a nitrogen atmosphere, and were then stirred at 220° C. for 30 minutes.

Thereafter, the reaction mixture was analyzed by $^1$H-NMR. As a result, as methyl proton peaks on silicon, a peak of 0.055 ppm based on decamethylcyclopentasiloxane and a peak of 0.378 ppm based on dimethyldiphenoxy silane were observed. The conversion percentage of the decamethylcyclopentasiloxane calculated from the ratio of the two peak areas was 87%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were observed. The molar ratio between dimethyldiphenoxy silane and 1,1,3,3-tetramethyl-1,3-diphenoxydisiloxane was obtained from the ratio of the two peak areas, and as a result, it was 97.4:2.6.

Example 16

Hexamethylcyclotrisiloxane represented by the following formula (8) (7.4 g; 33.3 mmol; Si molar amount: 100.0 mmol), diphenyl carbonate (21.4 g; 100.0 mmol), and cesium carbonate used as a catalyst (65 mg; 0.2 mmol) were substituted in a nitrogen atmosphere, and were then stirred at 220° C. for 30 minutes.

[Formula 13]

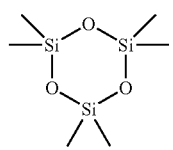

(8)

Thereafter, the reaction mixture was analyzed by $^1$H-NMR. As a result, a methyl proton peak on silicon that was based on the hexamethylcyclotrisiloxane was not observed, and the conversion percentage of the hexamethylcyclotrisiloxane was 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the ratio of the two peak areas, and as a result, it was 99.3:0.7.

Example 17

Octamethylcyclotetrasiloxane represented by the following formula (9) (7.4 g; 25.0 mmol; Si molar amount: 100.0 mmol), diphenyl carbonate (21.4 g; 100.0 mmol), and cesium carbonate used as a catalyst (65 mg; 0.2 mmol) were substituted in a nitrogen atmosphere, and were then stirred at 220° C. for 30 minutes.

[Formula 14]

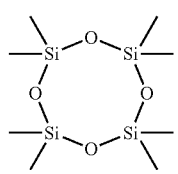

(9)

Thereafter, the reaction mixture was analyzed by ¹H-NMR. As a result, a methyl proton peak on silicon that was based on the octamethylcyclotetrasiloxane was not observed, and the conversion percentage of the octamethylcyclotetrasiloxane was 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the ratio of the two peak areas, and as a result, it was 99.4:0.6.

Example 18

Decamethylcyclopentasiloxane (7.4 g; 20.0 mmol; Si molar amount: 100.0 mmol), diphenyl carbonate (21.4 g; 100.0 mmol), and cesium hydroxide used as a catalyst (75 mg; 0.5 mmol) were substituted in a nitrogen atmosphere, and were then stirred at 200° C. for 60 minutes.

Thereafter, the reaction mixture was analyzed by ¹H-NMR. As a result, a methyl proton peak on silicon that was based on the decamethylcyclopentasiloxane was not observed, and the conversion percentage of the decamethylcyclopentasiloxane was 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the ratio of the two peak areas, and as a result, it was 98.2:1.8.

Example 19

Decamethylcyclopentasiloxane (7.4 g; 20.0 mmol; Si molar amount: 100.0 mmol), diphenyl carbonate (21.4 g; 100.0 mmol), and potassium hydroxide used a catalyst (11 mg; 0.2 mmol) were substituted in a nitrogen atmosphere, and were then stirred at 200° C. for 60 minutes.

Thereafter, the reaction mixture was analyzed by ¹H-NMR. As a result, a methyl proton peak on silicon that was based on the decamethylcyclopentasiloxane was not observed, and the conversion percentage of the decamethylcyclopentasiloxane was 100%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were merely observed. The molar ratio between dimethyldiphenoxy silane and 1,1,3,3-tetramethyl-1,3-diphenoxydisiloxane was obtained from the ratio of the two peak areas, and as a result, it was 97.6:2.4.

Example 20

Decamethylcyclopentasiloxane (7.4 g; 20.0 mmol; Si molar amount: 100.0 mmol), diphenyl carbonate (21.4 g; 100.0 mmol), and sodium hydroxide used as a catalyst (12 mg; 0.3 mmol) were substituted in a nitrogen atmosphere, and were then stirred at 200° C. for 60 minutes.

Thereafter, the reaction mixture was analyzed by ¹H-NMR. As a result, as methyl proton peaks on silicon, a peak of 0.055 ppm based on decamethylcyclopentasiloxane and a peak of 0.378 ppm based on dimethyldiphenoxy silane were observed. The conversion percentage of the decamethylcyclopentasiloxane calculated from the ratio of the two peak areas was 66%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were observed. The molar ratio between dimethyldiphenoxy silane and 1,1,3,3-tetramethyl-1,3-diphenoxydisiloxane was obtained from the ratio of the two peak areas, and as a result, it was 94.4:5.6.

Example 21

Decamethylcyclopentasiloxane (7.4 g; 20.0 mmol; Si molar amount: 100.0 mmol), diphenyl carbonate (21.4 g; 100.0 mmol), and cesium carbonate used as a catalyst (33 mg; 0.1 mmol) were substituted in a nitrogen atmosphere, and were then stirred at 120° C. for 60 minutes.

Thereafter, the reaction mixture was analyzed by ¹H-NMR. As a result, as methyl proton peaks on silicon, a peak of 0.055 ppm based on decamethylcyclopentasiloxane and a peak of 0.378 ppm based on dimethyldiphenoxy silane were observed. The conversion percentage of the decamethylcyclopentasiloxane calculated from the ratio of the two peak areas was 67%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were observed. The molar ratio between dimethyldiphenoxy silane and 1,1,3,3-tetramethyl-1,3-diphenoxydisiloxane was obtained from the ratio of the two peak areas, and as a result, it was 82.0:18.0.

Example 22

Decamethylcyclopentasiloxane (7.4 g; 20.0 mmol; Si molar amount: 100.0 mmol), diphenyl carbonate (21.4 g; 100.0 mmol), and cesium carbonate used as a catalyst (33 mg; 0.1 mmol) were substituted in a nitrogen atmosphere, and were then stirred at 90° C. for 60 minutes.

Thereafter, the reaction mixture was analyzed by ¹H-NMR. As a result, as methyl proton peaks on silicon, a peak of 0.055 ppm based on decamethylcyclopentasiloxane and a peak of 0.378 ppm based on dimethyldiphenoxy silane were observed. The conversion percentage of the decamethylcyclopentasiloxane calculated from the ratio of the two peak areas was 2%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were observed. The molar ratio between dimethyldiphenoxy silane and 1,1,3,3-tetramethyl-1,3-diphenoxydisiloxane was obtained from the ratio of the two peak areas, and as a result, it was 33.3:66.7.

Example 23

1,3,5,7,9,11,13,15-Octamethylpentacyclo[9.5.1.1$^{3,9}$.1$^{5,15}$.1$^{7,13}$]octasiloxane (2.06 g; 3.83 mmol; Si molar amount: 30.7 mmol), diphenyl carbonate (9.85 g; 46.0 mmol), and cesium carbonate used as a catalyst (15 mg; 0.05 mmol) were substituted in a nitrogen atmosphere, and were then stirred at 180° C. for 150 minutes.

Thereafter, the reaction mixture was analyzed by ¹H-NMR. As a result, a methyl proton peak on silicon that was based on the 1,3,5,7,9,11,13,15-octamethylpentacyclo [9.5.1.1$^{3,9}$.1$^{5,15}$.1$^{7,13}$]octasiloxane was not observed, and the conversion percentage of the 1,3,5,7,9,11,13,15-octamethylpentacyclo[9.5.1.1$^{3,9}$.1$^{5,15}$.1$^{7,13}$]octasiloxane was 100%.

As methyl proton peaks on silicon, a peak of 0.483 ppm based on methyltriphenoxy silane and a peak of 0.289 ppm based on 1,3-dimethyl-1,1,3,3-tetraphenoxydisiloxane were merely observed. The molar ratio between methyltriphenoxy silane and 1,3-dimethyl-1,1,3,3-tetraphenoxydisiloxane was obtained from the ratio of the two peak areas, and as a result, it was 93.7:6.3.

The chemical formulae of triaryloxy silane compounds and the like as products are shown below. The following formula (10) shows methyltriphenoxy silane, and the following formula (11) shows 1,3-dimethyl-1,1,3,3-tetraphenoxydisiloxane.

[Formula 15]

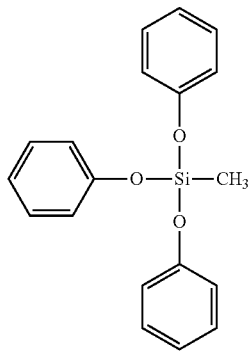

(10)

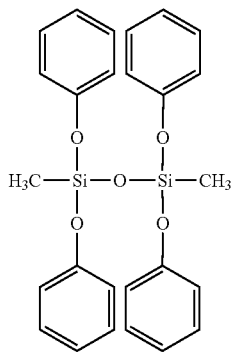

(11)

Example 24

1,3,5,7,9,11,13,15-Octaphenylpentacyclo[9.5.1.1$^{3,9}$.1$^{5,15}$.1$^{7,13}$]octasiloxane (3.96 g; 3.83 mmol; Si molar amount: 30.6 mmol), diphenyl carbonate (9.85 g; 46.0 mmol), and cesium carbonate used as a catalyst (15 mg; 0.05 mmol) were substituted in a nitrogen atmosphere, and were then stirred at 180° C. for 150 minutes.

Thereafter, the reaction mixture was analyzed by $^1$H-NMR. As a result, a proton peak at a para position of the 1,3,5,7,9,11,13,15-octaphenylpentacyclo[9.5.1.1$^{3,9}$.1$^{5,15}$.1$^{7,13}$]octasiloxane was not observed, and the conversion percentage of the 1,3,5,7,9,11,13,15-octaphenylpentacyclo[9.5.1.1$^{3,9}$.1$^{5,15}$.1$^{7,13}$]octasiloxane was confirmed to be 100%.

To the reaction mixture that had been cooled to room temperature and had been then solidified, 10 g of heptane was added, and the obtained mixture was heated to 90° C., followed by hot filtration. The obtained filtrate was left at room temperature for 3 days, so that a white crystal was precipitated. Thereafter, 5 g of heptane cooled to 5° C. was further added to the crystal, and the obtained mixture was filtrated. The thus obtained crystal was removed from the filter paper, and was then dried at 40° C., at a degree of pressure reduction of 1 hPa for 45 hours, so as to obtain 9.42 g of white powders.

The obtained powders were analyzed by $^1$H-NMR. As a result, peaks derived from phenyltriphenoxy silane and 1,3-diphenyl-1,1,3,3-tetraphenoxydisiloxane were observed. The molar ratio between phenyltriphenoxy silane and 1,3-diphenoxy-1,1,3,3-tetraphenyldisiloxane was obtained from the peak area ratio, and as a result, it was 96.0:4.0.

The yield of the molar amount of phenyltriphenoxy silane, which was obtained from the weight of the obtained white powders and the above-described molar ratio, was 76.8%, with respect to the molar amount of silicon atoms contained in the octaphenylcyclotetrasiloxane.

The chemical formulae of triaryloxy silane compounds and the like as products are shown below. The following formula (12) shows phenyltriphenoxy silane, and the following formula (13) shows 1,3-diphenyl-1,1,3,3-tetraphenoxydisiloxane.

[Formula 16]

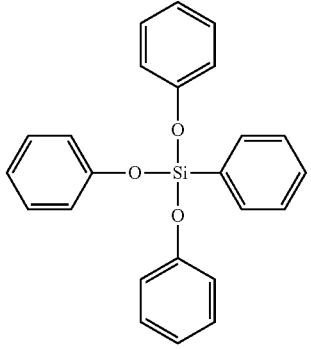

(12)

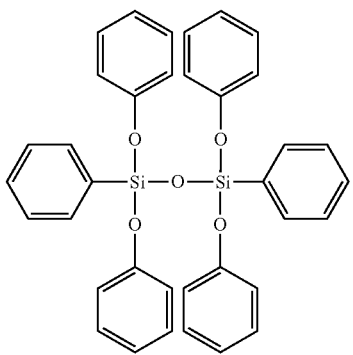

(13)

Example 25

A dropping funnel, a thermometer, and a cooling tube were equipped into a 500-ml four-neck flask. Thereafter, diphenyl carbonate (246.35 g; 1.15 mol), and cesium carbonate used as a catalyst (0.3748 g, 1.15 mmol) were added into the flask, and they were then heated to 180° C., without stirring. Diphenyl carbonate was dissolved around 100° C. After the temperature had reached 180° C., decamethylcyclopentasiloxane (85.30 g; 0.23 mol) was added dropwise to the reaction mixture at a dropping speed of 1 ml/min over 90 minutes. Immediately after initiation of the dropwise addition of the decamethylcyclopentasiloxane, $CO_2$ gas was generated. After completion of the dropwise addition of the decamethylcyclopentasiloxane, the temperature was increased to 200° C., and the reaction mixture was heated at 200° C. for 90 minutes. Thereafter, the heating was terminated, and the reaction was completed.

Subsequently, the reaction mixture was cooled to 40° C., and was then subjected to reduced-pressure distillation at a degree of pressure reduction of 4 hPa and at 150° C., so as to obtain 270 g of a colorless oily component similar to that of Example 1.

Comparative Example 1

Decamethylcyclopentasiloxane (7.4 g; 20.0 mmol; Si molar amount: 100.0 mmol), diphenyl carbonate (21.4 g; 100.0 mmol), and cesium carbonate used as a catalyst (33 mg; 0.1 mmol) were substituted in a nitrogen atmosphere, and were then stirred at room temperature for 60 minutes.

The obtained mixture was analyzed by $^1$H-NMR. As a result, as a methyl proton peak on silicon, only a proton peak based on the decamethylcyclopentasiloxane was observed, and the conversion percentage of the decamethylcyclopentasiloxane was 0%.

Comparative Example 2

Decamethylcyclopentasiloxane (7.4 g; 20.0 mmol; Si molar amount: 100.0 mmol) and diphenyl carbonate (21.4 g; 100.0 mmol) were substituted in a nitrogen atmosphere, and were then stirred at 200° C. for 60 minutes.

The obtained mixture was analyzed by $^1$H-NMR. As a result, as a methyl proton peak on silicon, only a proton peak based on the decamethylcyclopentasiloxane was observed, and the conversion percentage of the decamethylcyclopentasiloxane was 0%.

Comparative Example 3

Decamethylcyclopentasiloxane (0.37 g; 1.0 mmol; Si molar amount: 5.0 mmol), phenol (0.94 g; 10.0 mmol), and cesium carbonate used as a catalyst (3.3 mg; 0.01 mmol) were substituted in a nitrogen atmosphere, and were then stirred at 175° C. for 90 minutes.

Thereafter, the reaction mixture was analyzed by $^1$H-NMR. As a result, as methyl proton peaks on silicon, a peak of 0.055 ppm based on decamethylcyclopentasiloxane and a peak of 0.378 ppm based on dimethyldiphenoxy silane were observed. The conversion percentage of the decamethylcyclopentasiloxane calculated from the ratio of the two peak areas was 4%.

As methyl proton peaks on silicon, a peak of 0.378 ppm based on dimethyldiphenoxy silane and a peak of 0.222 ppm based on 1,1,3,3-tetramethyl-1,3-diphenoxydisiloxane were observed. The molar ratio between dimethyldiphenoxy silane and 1,1,3,3-tetramethyl-1,3-diphenoxydisiloxane was obtained from the ratio of the two peak areas, and as a result, it was 59.6:40.4.

The results of individual examples and comparative examples are shown in the following Table 2 and Table 3.

TABLE 2

| Components | | | | Ex. 1 | Ex. 2 | Ex. 3 | Ex. 4 | Ex. 5 | Ex. 6 | Ex. 7 |
|---|---|---|---|---|---|---|---|---|---|---|
| Components | A) Siloxane compound | Decamethylcyclo-pentasiloxane | mmol (Si mol amount) | 101 | 100 | 100 | 100 | | | |
| | | Octaphenylcyclo-tetrasiloxane | mmol (Si mol amount) | | | | | 75 | 75 | 75 |
| | | Dimethylpoly-siloxane (hydroxy terminal treatment, molecular weight: 4,200) | mmol (Si mol amount) | | | | | | | |
| | | Dimethylpoly-siloxane (trimethylsiloxy terminus, molecular weight: 40,000) | mmol (Si mol amount) | | | | | | | |
| | | Hexamethylcyclo-trisiloxane | mmol (Si mol amount) | | | | | | | |
| | | Octamethylcyclo-tetrasiloxane | mmol (Si mol amount) | | | | | | | |
| | B) Carbonate compound | Diphenyl carbonate | mmol | 101 | 110 | 150 | 90 | 75 | 78.8 | 82.6 |
| | | Dibutyl carbonate | mmol | | | | | | | |
| | Phenol | | mmol | | | | | | | |
| | C) Basic compound catalyst | | — | $Cs_2CO_3$ | $Cs_2CO_3$ | $Cs_2CO_3$ | $Cs_2CO_3$ | $Cs_2CO_3$ | $Cs_2CO_3$ | $Cs_2CO_3$ |
| | X (molar amount of carbonate compound/Si molar amount of siloxane compound) | | mmol | 1.0 | 1.1 | 1.5 | 0.9 | 1.0 | 1.05 | 1.10 |
| | Y (molar amount (mmol) of basic compound catalyst/Si molar amount (mol) of siloxane compound) | | mmol/mol | 1.0 | 1.0 | 1.0 | 1.0 | 1.3 | 1.3 | 1.3 |

TABLE 2-continued

| | | | | | | | | | | |
|---|---|---|---|---|---|---|---|---|---|---|
| Reaction conditions/ Evaluation results | Reaction temperature | | °C. | 200 | 200 | 200 | 200 | 200 | 200 | 200 |
| | Conversion percentage of siloxane compound | | % | 100 | 100 | 100 | 100 | 100 | 100 | 100 |
| | Molar ratio (molar amount of product of interest:molar amount of by-product) | | % | 98.6:1.4 | 99.8:0.2 | 98.8:1.2 | 93.2:6.8 | 95.4:4.6 | 99.5:0.5 | 99.6:0.4 |

| | | | | Ex. 8 | Ex. 9 | Ex. 10 | Ex. 11 | Ex. 12 | Ex. 13 |
|---|---|---|---|---|---|---|---|---|---|
| Components | A) Siloxane compound | Decamethylcyclo-pentasiloxane | mmol (Si mol amount) | | | 100 | 100 | 100 | 100 |
| | | Octaphenylcyclo-tetrasiloxane | mmol (Si mol amount) | | | | | | |
| | | Dimethylpoly-siloxane (hydroxy terminal treatment, molecular weight: 4,200) | mmol (Si mol amount) | 100 | | | | | |
| | | Dimethylpoly-siloxane (trimethylsiloxy terminus, molecular weight: 40,000) | mmol (Si mol amount) | | 100 | | | | |
| | | Hexamethylcyclo-trisiloxane | mmol (Si mol amount) | | | | | | |
| | | Octamethylcyclo-tetrasiloxane | mmol (Si mol amount) | | | | | | |
| | B) Carbonate compound | Diphenyl carbonate | mmol | 100 | 100 | | 100 | 100 | 100 |
| | | Dibutyl carbonate | mmol | | | 100 | | | |
| | Phenol | | mmol | | | | | | |
| | C) Basic compound catalyst | | — | $Cs_2CO_3$ | $Cs_2CO_3$ | $Cs_2CO_3$ | $Cs_2CO_3$ | $Cs_2CO_3$ | $K_2CO_3$ |
| | X (molar amount of carbonate compound/Si molar amount of siloxane compound) | | mmol | 1.0 | 1.0 | 1.0 | 1.0 | 1.0 | 1.0 |
| | Y (molar amount (mmol) of basic compound catalyst/Si molar amount (mol) of siloxane compound) | | mmol/mol | 2.0 | 1.0 | 1.0 | 1.0 | 2.0 | 2.0 |
| Reaction conditions/ Evaluation results | Reaction temperature | | °C. | 220 | 200 | 200 | 150 | 220 | 220 |
| | Conversion percentage of siloxane compound | | % | 100 | 100 | 69 | 71 | 100 | 100 |
| | Molar ratio (molar amount of product of interest:molar amount of by-product) | | % | 95.0:5.0 | 98.1:1.9 | — | 78.7:21.3 | 99.6:0.4 | 99.7:0.3 |

TABLE 3

| | | | | Ex. 14 | Ex. 15 | Ex. 16 | Ex. 17 | Ex. 18 | Ex. 19 | Ex. 20 | Ex. 21 |
|---|---|---|---|---|---|---|---|---|---|---|---|
| Components | A) Siloxane compound | Decamethylcyclo-pentasiloxane | mmol (Si mol amount) | 100 | 100 | | | 100 | 100 | 100 | 100 |
| | | Octaphenylcyclo-tetrasiloxane | mmol (Si mol amount) | | | | | | | | |
| | | Dimethylpoly-siloxane (hydroxy terminal treatment, molecular weight: 4,200) | mmol (Si mol amount) | | | | | | | | |
| | | Dimethylpoly-siloxane (trimethylsiloxy terminus, molecular weight: 40,000) | mmol (Si mol amount) | | | | | | | | |
| | | Hexamethylcyclo-trisiloxane | mmol (Si mol amount) | | | | 100 | | | | |
| | | Octamethylcyclo-tetrasiloxane | mmol (Si mol amount) | | | | | 100 | | | |

TABLE 3-continued

|  |  |  |  |  |  |  |  |  |  |  |
|---|---|---|---|---|---|---|---|---|---|---|
|  |  | Octamethylpenta-cyclooctasiloxane | mmol (Si mol amount) |  |  |  |  |  |  |  |
|  |  | Octaphenylpenta-cyclooctasiloxane | mmol (Si mol amount) |  |  |  |  |  |  |  |
|  |  | Decamethylcyclo-pentasiloxane | mmol (Si mol amount) |  |  |  |  |  |  |  |
|  | B) Carbonate compound | Diphenyl carbonate | mmol | 100 | 100 | 100 | 100 | 100 | 100 | 100 | 100 |
|  |  | Dibutyl carbonate | mmol |  |  |  |  |  |  |  |  |
|  | Phenol |  | mmol |  |  |  |  |  |  |  |  |
|  | C) Basic compound catalyst |  | — | $Na_2CO_3$ | $NaHCO_3$ | $Cs_2CO_3$ | $Cs_2CO_3$ | CsOH | KOH | NaOH | $Cs_2CO_3$ |
|  | X (molar amount of carbonate compound/Si molar amount of siloxane compound) |  | mol/mol | 1.0 | 10 | 1.0 | 1.0 | 1.0 | 1.0 | 1.0 | 1.0 |
|  | Y (molar amount (mmol) of basic compound catalyst/Si molar amount (mol) of siloxane compound) |  | mmol/mol | 2.0 | 2.0 | 2.0 | 2.0 | 5.0 | 2.0 | 3.0 | 1.0 |
| Reaction conditions/ Evaluation results | Reaction temperature |  | °C. | 220 | 220 | 220 | 220 | 200 | 200 | 200 | 120 |
|  | Conversion percentage of siloxane compound |  | % | 89 | 87 | 100 | 100 | 100 | 100 | 66 | 67 |
|  | Molar ratio (molar amount of product of interest:molar amount of by-product) |  | % | 94.3:5.7 | 97.4:2.6 | 99.3:0.7 | 99.4:0.6 | 98.2:1.8 | 97.6:2.4 | 94.4:5.6 | 82.0:18.0 |

|  |  |  |  | Ex. 22 | Ex. 23 | Ex. 24 | Ex. 25 | Comp. Ex. 1 | Comp. Ex. 2 | Comp. Ex. 3 |
|---|---|---|---|---|---|---|---|---|---|---|
| Components | A) Siloxane compound | Decamethylcyclo-pentasiloxane | mmol (Si mol amount) | 100 |  |  |  | 100 | 100 | 5 |
|  |  | Octaphenylcyclo-tetrasiloxane | mmol (Si mol amount) |  |  |  |  |  |  |  |
|  |  | Dimethylpoly-siloxane (hydroxy terminal treatment, molecular weight: 4,200) | mmol (Si mol amount) |  |  |  |  |  |  |  |
|  |  | Dimethylpoly-siloxane (trimethylsiloxy terminus, molecular weight: 40,000) | mmol (Si mol amount) |  |  |  |  |  |  |  |
|  |  | Hexamethylcyclo-trisiloxane | mmol (Si mol amount) |  |  |  |  |  |  |  |
|  |  | Octamethylcyclo-tetrasiloxane | mmol (Si mol amount) |  |  |  |  |  |  |  |
|  |  | Octamethylpenta-cyclooctasiloxane | mmol (Si mol amount) |  |  | 3.83 |  |  |  |  |
|  |  | Octaphenylpenta-cyclooctasiloxane | mmol (Si mol amount) |  |  |  | 3.83 |  |  |  |
|  |  | Decamethylcyclo-pentasiloxane | mmol (Si mol amount) |  |  |  | 230 |  |  |  |
|  | B) Carbonate compound | Diphenyl carbonate | mmol | 100 | 46 | 46 | 1150 | 100 | 100 |  |
|  |  | Dibutyl carbonate | mmol |  |  |  |  |  |  |  |
|  | Phenol |  | mmol |  |  |  |  |  |  | 10 |
|  | C) Basic compound catalyst |  | — | $Cs_2CO_3$ | $Cs_2CO_3$ | $Cs_2CO_3$ | $Cs_2CO_3$ | $Cs_2CO_3$ | None | $Cs_2CO_3$ |
|  | X (molar amount of carbonate compound/Si molar amount of siloxane compound) |  | mol/mol | 1.0 | 1.5 | 1.5 | 1.0 | 1.0 | 1.0 | — |
|  | Y (molar amount (mmol) of basic compound catalyst/Si molar amount (mol) of siloxane compound) |  | mmol/mol | 1.0 | 1.6 | 1.6 | 1.0 | 1.0 | 0.0 | 2.0 |
| Reaction conditions/ Evaluation results | Reaction temperature |  | °C. | 90 | 180 | 180 | 200 | Room temperature | 200 | 175 |
|  | Conversion percentage of siloxane compound |  | % | 2 | 100 | 100 | 100 | 0 | 0 | 4 |
|  | Molar ratio (molar amount of product of interest:molar amount of by-product) |  | % | 33.3:66.7 | 93.7:6.3 | 96.0:4.0 | 96.9:3.1 | — | — | 59.6:40.4 |

The invention claimed is:

1. A method for producing a silane compound, comprising a diaryloxy silane compound, a dialkoxy silane compound, a monoaryloxymonoalkoxy silane compound, a triaryloxy silane compound, and a trialkoxy silane compound, wherein the method has D) siloxane decomposition by heating a mixture comprising:
A) a siloxane compound(s) that are A-1) a cyclic siloxane compound represented by the following formula (1), A-2) a linear siloxane compound represented by the following formula (2), and/or a silsesquioxane compound comprising a siloxane bond as a main chain skeleton, represented by the following formula (3),
B) a carbonate compound comprising a diaryl carbonate, dialkyl carbonate, or a monoalkylmonoaryl carbonate, and
C) a basic compound catalyst,
so as to alkoxylate and/or aryloxylate A) the siloxane compound(s):

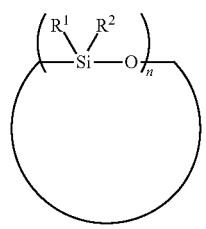

(1)

wherein $R^1$ and $R^2$ each independently represent an alkyl group, an alkenyl group, or an aryl group, each optionally having a substituent, and
n represents an integer of 3 or more and 30 or less,

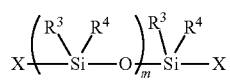

(2)

wherein $R^3$ and $R^4$ each independently represent an alkyl group, an alkenyl group, or an aryl group, each optionally having a substituent,
m represents an integer of 2 or more and 10000 or less, and
X each independently represents a hydrogen atom, a hydroxyl group, an alkoxy group optionally having a substituent and having a total carbon number of 1 to 10, a hydrocarbon group optionally having a substituent, optionally having an oxygen atom or a nitrogen atom and having a total carbon number of 1 to 10, or an amino group optionally having a substituent, and $$[R^5SiO_{1.5}]p \qquad (3)$$

wherein $R^5$ represents an alkyl group containing 1 to 4 carbon atoms, an alkenyl group containing 2 to 4 carbon atoms, or an aryl group containing 6 to 12 carbon atoms, each optionally having a substituent, and
p represents an integer of 4 or more and 24 or less,
wherein B) the carbonate compound comprises at least diphenyl carbonate, and
wherein C) the basic compound catalyst comprises at least an alkali metal carbonate.

2. A method for producing a silane compound comprising a diaryloxy silane compound, a dialkoxy silane compound, and a monoaryloxymonoalkoxy silane compound, wherein the method has D) a siloxane decomposition step of heating a mixture comprising:
A) a siloxane compound(s) that are A-1) a cyclic siloxane compound represented by the following formula (1), and/or A-2) a linear siloxane compound represented by the following formula (2),
B) a carbonate compound including, at least, any one of diaryl carbonate, dialkyl carbonate, or a monoalkylmonoaryl carbonate, and
C) a basic compound catalyst,
so as to alkoxylate and/or aryloxylate A) the siloxane compound(s):

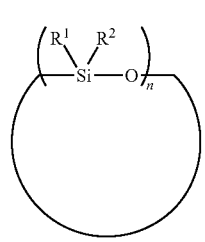

(1)

wherein $R^1$ and $R^2$ each independently represent an alkyl group, an alkenyl group, or an aryl group, each optionally having a substituent, and
n represents an integer of 3 or more and 30 or less, and

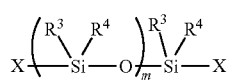

(2)

wherein $R^3$ and $R^4$ each independently represent an alkyl group, an alkenyl group, or an aryl group, each optionally having a substituent,
m represents an integer of 2 or more and 10000 or less, and
X each independently represents a hydrogen atom, a hydroxyl group, an alkoxy group optionally having a substituent and having a total carbon number of 1 to 10, a hydrocarbon group optionally having a substituent, optionally having an oxygen atom or a nitrogen atom and having a total carbon number of 1 to 10, or an amino group optionally having a substituent,
wherein B) the carbonate compound comprises at least diphenyl carbonate, and
wherein C) the basic compound catalyst comprises at least an alkali metal carbonate.

3. The method for producing a silane compound according to claim 1, wherein the $R^1$ to $R^4$ each independently represent an alkyl group or an alkenyl group having a total carbon number of 1 to 8, or an aryl group having a total carbon number of 6 to 30, each optionally having a substituent.

4. The method for producing a silane compound according to claim 3, wherein the $R^1$ to $R^4$ each independently represent any one selected from the group consisting of a methyl group, a phenyl group, a vinyl group, and a propyl group.

5. The method for producing a silane compound according to claim 1, wherein B) the diaryl carbonate includes diphenyl carbonate.

6. The method for producing a silane compound according to claim 1, wherein the number of carbon atoms contained in the alkyl group in B) the dialkyl carbonate is 4 or less.

7. The method for producing a silane compound according to claim 1, wherein C) the basic compound catalyst further comprises an alkali metal hydroxide.

8. The method for producing a silane compound according to claim 1, wherein C) the basic compound catalyst comprises cesium carbonate or potassium carbonate.

9. The method for producing a silane compound according to claim 1, wherein, in D) the siloxane decomposition, the ratio x of the molar amount of B) the carbonate compound to the Si molar amount of A) the siloxane compound is x≥1.

10. The method for producing a silane compound according to claim 1, wherein, in D) the siloxane decomposition, the ratio x of the molar amount of B) the carbonate compound to the Si molar amount of A) the siloxane compound is 0.8<x<2.0.

11. The method for producing a silane compound according to claim 1, wherein, in D) the siloxane decomposition, the ratio y of the molar ratio of C) the basic compound catalyst to the Si molar amount of A) the siloxane compound is 0.0001 mmol/mol≤y≤20 mmol/mol.

12. The method for producing a silane compound according to claim 1, wherein, in D) the siloxane decomposition, the temperature applied to decompose A) the siloxane compound is 50° C. or higher and 300° C. or lower.

13. The method for producing a silane compound according to claim 12, wherein, in D) the siloxane decomposition, the temperature applied to decompose A) the siloxane compound is 50° C. or higher and 150° C. or lower.

14. The method for producing a silane compound according to claim 1, wherein the molecular weight of A-1) the cyclic siloxane compound represented by the formula (1) is 2,000 or less, the molecular weight of A-2) the linear siloxane compound represented by the formula (2) is 60,000 or less, and the molecular weight of A-3) the silsesquioxane compound represented by the formula (3) is 3,500 or less.

15. The method for producing a silane compound according to claim 1, which further comprises E) distillation/recrystallization that comprises distilling the silane compound generated by D) the siloxane decomposition or recrystallization by recrystallizing the silane compound generated by D) the siloxane decomposition.

16. The method for producing a silane compound according to claim 14, wherein the pressure applied in E) the distillation is 1 hPa or more and 20 hPa or less.

17. The method for producing a silane compound according to claim 1, which further comprises F) a dropping by adding A) the siloxane compound dropwise to a mixture comprising B) the carbonate compound and C) the basic compound catalyst.

* * * * *